United States Patent
Del Ponte et al.

(10) Patent No.: US 10,059,603 B2
(45) Date of Patent: Aug. 28, 2018

(54) WATER FILTRATION APPARATUS WITH COMPOSTABLE FILTER

(71) Applicant: FC Brands LLC, New York, NY (US)

(72) Inventors: Michael Robert Del Ponte, San Francisco, CA (US); Markus Peter Diebel, San Francisco, CA (US); Joe Sung-Ho Tan, San Francisco, CA (US)

(73) Assignee: FC Brands, LLC, New York, NY (US)

( * ) Notice: Subject to any disclaimer, the term of this patent is extended or adjusted under 35 U.S.C. 154(b) by 1174 days.

(21) Appl. No.: 14/071,477

(22) Filed: Nov. 4, 2013

(65) Prior Publication Data

US 2015/0122725 A1    May 7, 2015

(51) Int. Cl.
*C02F 1/00*    (2006.01)
*C02F 103/02*    (2006.01)

(52) U.S. Cl.
CPC .............. *C02F 1/002* (2013.01); *C02F 1/003* (2013.01); *C02F 2103/02* (2013.01); *C02F 2303/185* (2013.01); *C02F 2307/04* (2013.01)

(58) Field of Classification Search
CPC .. C02F 1/00; C02F 1/002; C02F 1/003; C02F 2103/02; C02F 2303/185
USPC .......................................................... 210/469
See application file for complete search history.

(56) References Cited

U.S. PATENT DOCUMENTS

| | | | | |
|---|---|---|---|---|
| 2,786,408 A | * | 3/1957 | Herrera | A47J 31/402 99/283 |
| 3,971,305 A | * | 7/1976 | Daswick | A47J 31/02 210/474 |
| 4,764,274 A | * | 8/1988 | Miller | C02F 1/003 210/232 |
| 4,834,025 A | * | 5/1989 | Tum | A01K 5/0121 119/51.5 |
| 7,438,799 B2 | * | 10/2008 | Vandenbelt | C02F 1/003 210/138 |
| 8,043,502 B2 | * | 10/2011 | Nauta | C02F 1/003 210/232 |
| 8,182,683 B1 | * | 5/2012 | Allen | C02F 1/003 210/244 |
| 8,541,039 B2 | * | 9/2013 | Lackey | C02F 1/003 426/394 |

* cited by examiner

*Primary Examiner* — Robert Clemente
*Assistant Examiner* — Akash K Varma
(74) *Attorney, Agent, or Firm* — Pierce Atwood LLP

(57) ABSTRACT

Water filtration apparatus with compostable filters are disclosed herein. A water filtration apparatus in accordance with one embodiment of the disclosure includes a fluid containment vessel having a conically shaped upper chamber and a conically shaped lower chamber. A filter assembly is seated within the upper chamber and carries a compostable filter device that fits within a filter cavity of the filter assembly.

5 Claims, 6 Drawing Sheets

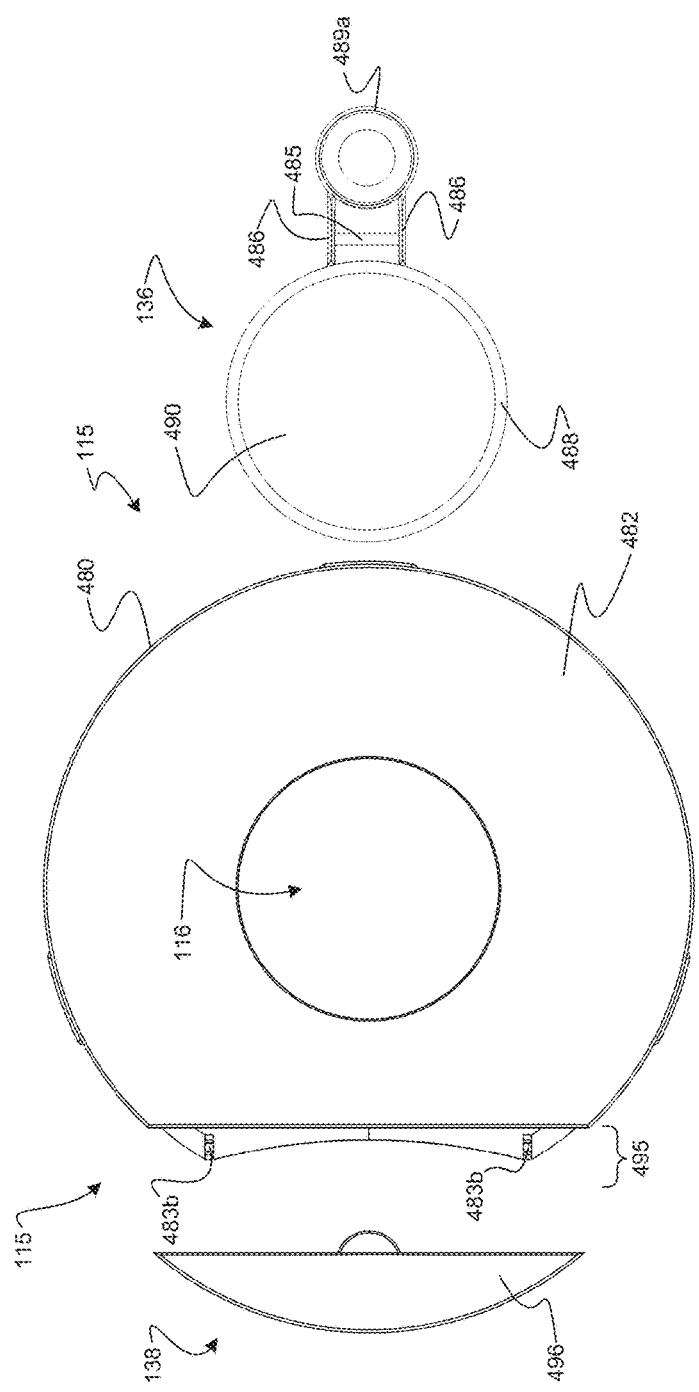
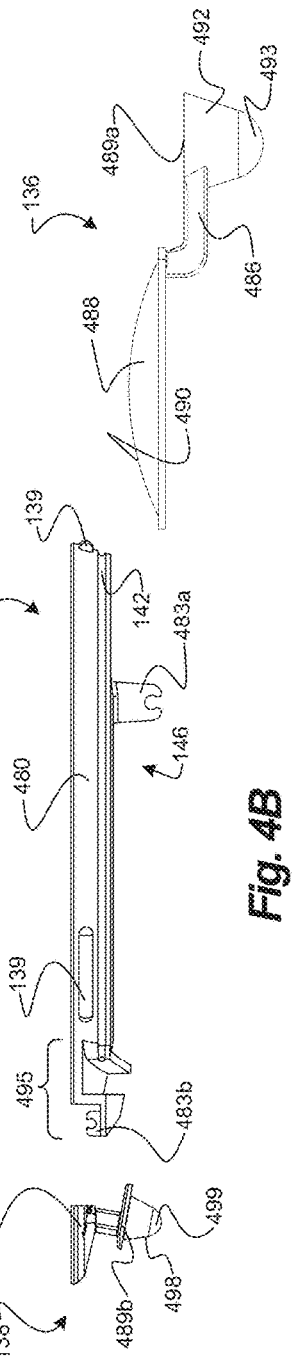
Fig. 4A
Fig. 4B

WATER FILTRATION APPARATUS WITH COMPOSTABLE FILTER

TECHNICAL FIELD

The present disclosure relates generally to fluid filtration, and in particular to water filtration apparatus, such as pitchers, containers, or other vessels that carry water filters.

BACKGROUND

Conventional water filter pitchers typically include a plastic housing that fits into the top of the pitcher. The plastic housing carries a filter insert that holds a filtration media, such as activated carbon. In operation, a user can pour water into the top of the pitcher and through the plastic housing to treat the water using the filter insert. As the water passes through the filter insert, the activated carbon removes particulates and certain chemicals from the water (e.g., chlorine). Once filtered, the water enters the bottom of the pitcher and is ready for consumption.

BRIEF DESCRIPTION OF THE DRAWINGS

FIG. 4A is a partially exploded top view and FIG. 4B is a partially exploded side view of a lid assembly of the water filtration apparatus of FIGS. 1A and 1B.

DETAILED DESCRIPTION

The following disclosure describes various types of fluid filtration devices, apparatus, and systems, and methods of using such devices, apparatus, and systems. Certain details are set forth in the following description and in FIGS. 1A-5B to provide a thorough understanding of various embodiments of the disclosure. Other details describing well-known structures and systems often associated with fluid filtration, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 112 is first introduced and discussed with reference to FIG. 1A.

Figure 1A:
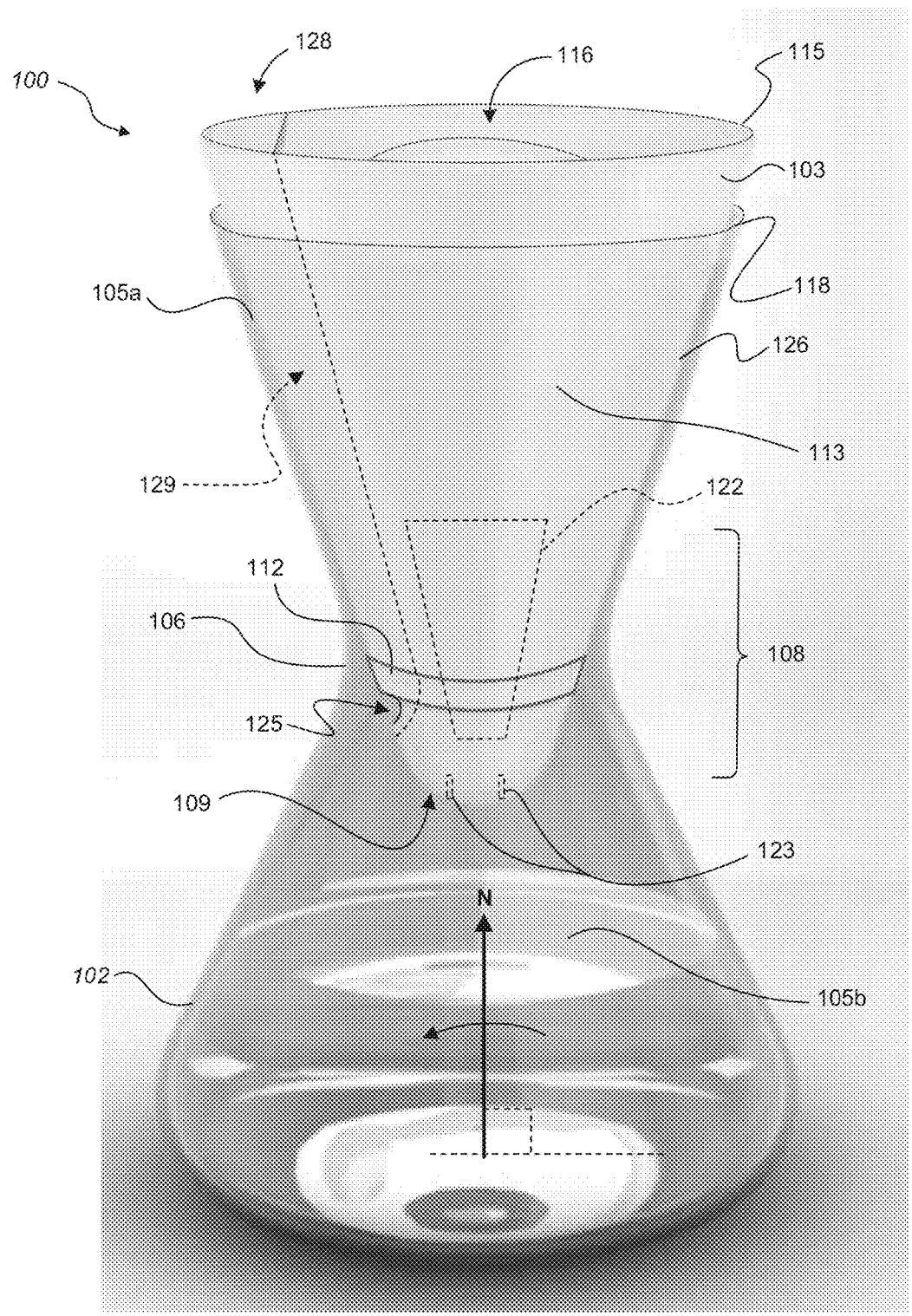
FIG. 1A is an isometric view and FIG. 1B is a partially exploded view of a water filtration apparatus configured in accordance with an embodiment of the present technology.
Figure 1B:
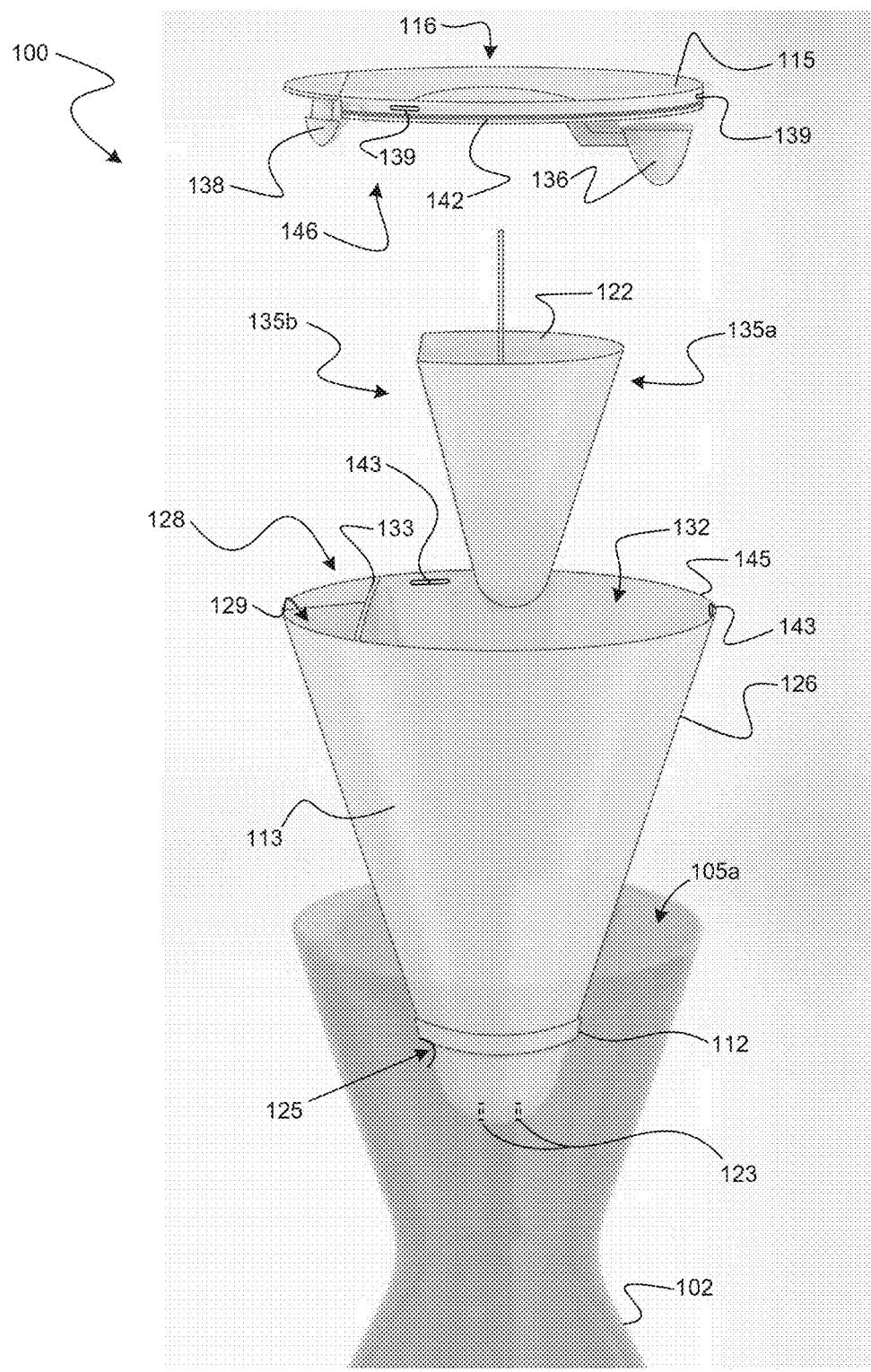

FIG. 1A is an isometric view and FIG. 1B is a partially exploded view of a water filtration apparatus 100 configured in accordance with an embodiment of the present technology. Referring first to FIG. 1A, the filtration apparatus 100 includes a fluid containment vessel 102 ("vessel 102") and a filter assembly 103 seated in the vessel 102. The vessel 102 includes a conically-shaped upper chamber 105a ("upper chamber 105a") carrying the filter assembly 103. The vessel 102 also includes a conically-shaped lower chamber 105b ("lower chamber 105b") inverted relative to the upper chamber 105a and in fluid communication with the upper chamber 105a via a passageway 106. As shown, the upper and lower chambers 105a, 105b are symmetric about the passageway 106 and together form an hourglass shape. The vessel 102 can be manufactured from a variety of transparent, semi-transparent, or translucent materials, such as glass, ceramics, non-opaque plastics, or other suitable materials. In other embodiments, the vessel 102 can be composed of different materials, such as opaque materials, and/or can include different features, such as different shapes or sizes. For example, in some embodiments, the upper and lower chambers 105a, 105b can have different shapes and/or sizes relative to one another (e.g., the lower chamber 105b can have a larger volume than the upper chamber 105a). In one aspect of this embodiment, the vessel 102 is in the shape of a carafe, and as such, it does not include a separate handle attached to the body of the vessel 102. Instead, a user can carry the vessel 102 at a grip portion 108 of the vessel toward the intersection of the upper and lower chambers 105a, 105b.

The filter assembly 103 has a conical shape that generally corresponds to the shape of the upper chamber 105a, and includes a bottom portion, shown as a vertex 109 that at least partially projects into the lower chamber 105b. In other embodiments, the bottom portion of the filter assembly 103 can be located substantially at the opening of the lower chamber 105b or above and facing the opening of the lower chamber 105b. A gasket 112 is attached to the illustrated filter assembly 103 toward the vertex 109 to form a seal between the filter assembly 103 and the wall of the vessel 102. The gasket 112 can be sized to snugly fit within approximately the center of the passageway 106 or within a position slightly offset from the center of the passageway 106 and more toward the lower chamber 105b. For example, when slightly offset, the gasket 112 can enhance the coupling between the vessel 102 and the filter assembly 103 due to the gasket 112 having a larger circumference than the passageway 106.

The filter assembly 103 includes a filter body 113 and a lid structure 115 ("lid 115") having a fill inlet 116. The filter body 113 carries the lid 115 above a rim 118 of the vessel 102 and positions a filter device 122 (shown in broken lines) beneath the fill inlet 116. The filter body 113 includes a plurality of drip ports 123 and a pour inlet 125 that are both formed through an outer wall 126 toward the vertex 109. The filter body 113 also includes a pour outlet 128 raised above the rim 118 and a pour channel 129 fluidly coupling the pour outlet 128 with the pour inlet 125.

In operation, a user can fill the vessel 102 with water at the fill inlet 116 and dispense filtered water at the pour outlet 128. For example, a user can position the fill inlet 116 beneath a water faucet to direct water into the filter assembly 103. When the water enters the filter assembly 103, it drips or "trickles" through the filter device 122 toward the drip ports 123 and into the lower chamber 105b. To dispense water, a user can tilt (i.e., cant) the vessel 102 relative to a normal position, or normal vector N, to a canted position (not shown) and in a direction toward the pour outlet 128 as shown by the arrow. When tilted, water in the lower chamber 105b enters the pour inlet 125 and exits to the pour outlet 128 via the pour channel 129. The gasket 112 blocks the water from back flowing between the filter body 113 and the wall of the vessel's upper chamber 105a, so effectively the only path for the water to flow from the lower chamber 105b is through the pour inlet 125 and pour channel 129.

To clean or wash the vessel 102 and/or the filter assembly 103, the user can unseat the filter assembly 103 by grasping the grip portion 108 of the vessel 102 with one hand and pulling axially on the filter assembly 103 with the other. In particular, the user can grasp and pull a portion of the filter assembly 103 that projects above the rim 118. Once the filter assembly 103 is unseated, wherein the gasket 112 is sealably disengaged from the wall of the vessel 102, the user can remove the filter device 122 and the lid 115 as a unit from the filter body 113.

In various embodiments, the vessel 102 and/or the filter assembly 103 can be composed of materials that are dishwasher safe. In one aspect of this embodiment, the vessel 102 and the filter assembly 103 facilitate cleaning because they contain a small number of components to wash. In another aspect of this embodiment, the vessel 102, the lid 115, and the filter body 113 have a size that allows them to be carried by a dishwasher tray.

Referring to FIG. 1B, the filter body 113 further includes a filter cavity 132 and an inner wall 133 that separates the filter cavity 132 from the pour channel 129. The filter device 122 has a semi-conical portion 135a and a wedge-shaped portion 135b that correspond to the interior shape of a portion of the filter cavity 132. Accordingly, when installed, the filter cavity 132 holds the filter device 122 in a fixed orientation such that it does not rotate within the filter cavity 132.

The lid 115 includes a movable inlet lever 136 vertically aligned with and configured to close at least a portion of the fill inlet 116. The lid 115 also has a movable outlet lever 138 (discussed in greater detail below) configured to close the pour outlet 128. The lid 115 also includes locking tabs 139 and a lid gasket 142. The locking tabs 139 engage with indented features 143 toward an outer rim 145 of the filter body 113 to detachably couple the lid 115 with the filter body 113. The lid gasket 142 forms a seal to prevent water from escaping from the filter cavity 132 (e.g., when dispensing water). In certain embodiments, the lid gasket 142 can enhance the attachment of the lid 115 to the filter body 113. In other embodiments, the lid 115 can include additional and/or different features for removably securing and/or sealing the lid 115. For example, in some embodiments the locking tabs 139 and the indented features 143 can be absent from the lid 115.

To install the lid 115, a user can place the lid 115 on the filter body 113 into an aligned position at which the inlet lever 136 is aligned with the outlet port 128. The user can then press downwardly on the lid 115 to engage the locking tabs 139 with the indented features 143. In one aspect of this embodiment, the locking tabs 139 and the indented features 143 are positioned such that the lid 115 will only engage the filter body 113 when the lid 115 is in the aligned position. To remove the lid 115, the user can extend one or more fingers into the fill inlet 116 and into the form of a hook to contact an underside 146 of the lid 115. In this position, the user can pull upwardly on the surface of the underside 146 in a direction away from the filter body 113 to unseat the lid 115.

Figure 2A:
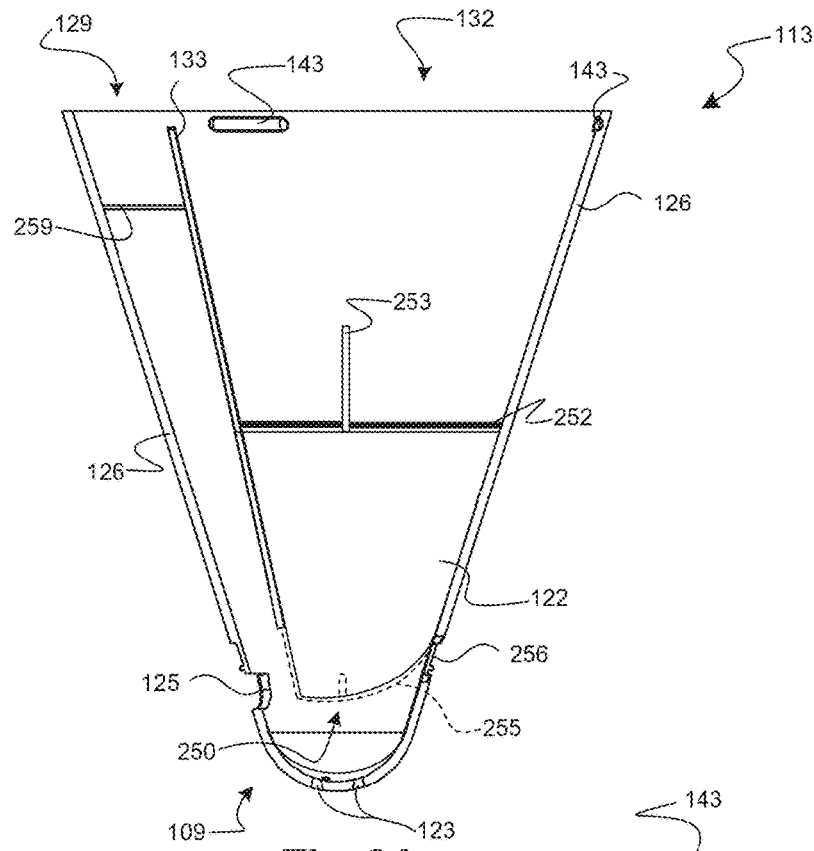
FIG. 2A is cross-sectional side view and FIG. 2B is a top view of a filter body of the water filtration apparatus of FIGS. 1A and 1B.

FIG. 2A is a cross-sectional side view of the filter body 113 of FIG. 1B with the filter device 122 installed in the filter cavity 132. As shown, the inner wall 133 extends toward but stops short of the vertex 109 of the filter body 113 such that a tip region 250 of the filter device 122 extends between the inner wall 133 and the outer wall 126. A ridge 252 within the filter cavity 132 holds the filter device 122 in a fixed position such that the tip region 250 projects beyond the inner wall 133 and toward the vertex 109. In various embodiments, a user can install the filter device 122 by "snapping" the filter device 122 into a locked position beneath the ridge 252. For example, a user can apply a small downward force via a handle 253 (e.g., a finger tab) on the filter device 122 to snap and releasably lock it into position. To unseat the filter device 122, the user can apply an upward force (which may include a lateral or twisting force) via the handle 253 to disengage the filter device 122 from the ridge 252, allowing the filter device to be lifted out of the locked position.

When installed, the filter device 122 and the inner wall 133 form a barrier 255 (represented by broken lines) at the vertex 109 between the filter cavity 132 and the pour channel 129. A vent 256 is positioned adjacent to the barrier 255 to equalize pressure. When pouring, for example, the vent 256 can evacuate air from the lower chamber 105b to enhance fluid flow through the pour channel 129.

Figure 2B:
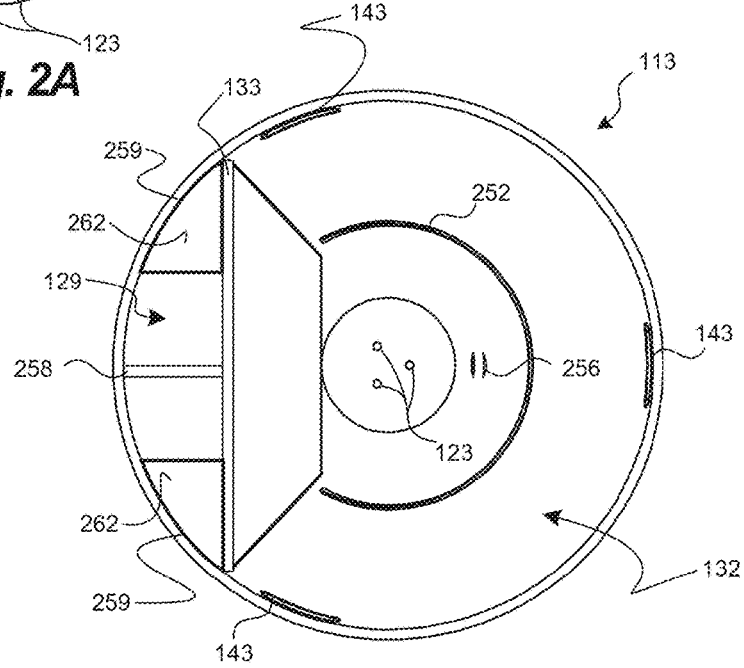

FIG. 2B is a top view of the filter body 113 with the filter device 122 removed from the filter cavity 132. As shown, a spacer 258 and flow control tabs 259 are disposed within the pour channel 129. The spacer 258 buttresses the inner wall 133 against the outer wall 126 to provide mechanical support. The flow control tabs 259 each include a control surface 262 that is generally transverse to water flow through the pour channel 129. In use, the flow control tabs 259 direct and/or restrict fluid flow through the pour channel 129 to prevent spillage or other inadvertent water migration. In certain embodiments, the control surface 262 can be made smaller to increase flow rate through the pour channel 129 (or larger to further reduce flow rate). In other embodiments, however, the flow control tabs 259 can be omitted. For example, the pour channel 129 itself can be made larger or smaller to direct and/or control fluid flow.

Figure 3A:
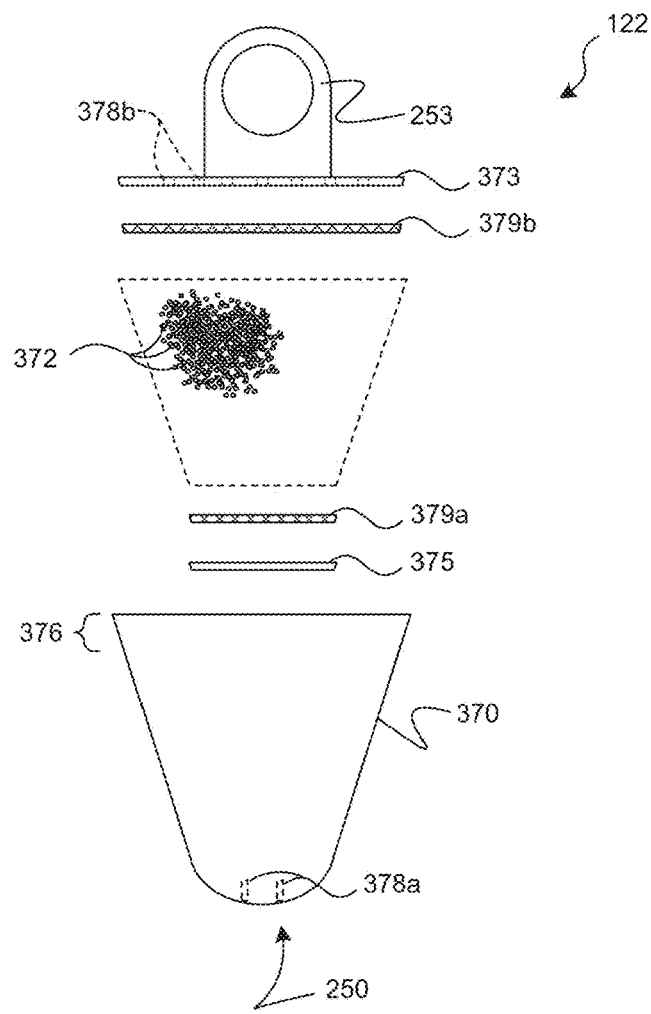
FIG. 3A is partially exploded side view and FIG. 3B is a top view of a filter device of the water filtration apparatus of FIGS. 1A and 1B.
Figure 3B:
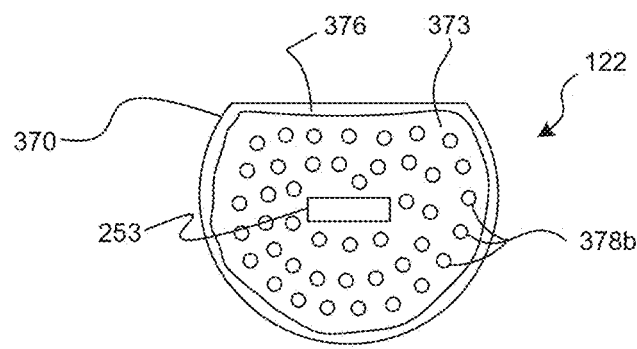

FIG. 3A is a partially exploded side view and FIG. 3B is a top view of the filter device 122. Referring to FIGS. 3A and 3B together, the filter device 122 includes a container 370 carrying a filtration media 372, a removable cap 373 detachably coupled to the container 370, and a containment plate 375 that fits within the container 370 toward the tip region 250. The container 370 includes an outer lip 376 configured to engage with the ridge 252 (FIG. 2A) for seating the filter device 122 (as previously described above). The container 370 also includes lower apertures 378a disposed toward the tip region 250 of the filter device 122. In one aspect of this embodiment, the lower apertures 378a are sized to prevent the filtration media (e.g., granules of the filtration media) from escaping from the filter device 122. In another aspect of this embodiment, the lower apertures 378a are spaced apart from the containment plate 375 to prevent filtration media from clogging the lower apertures 378a.

The removable cap 373 includes upper apertures 378b surrounding the handle 253. The upper apertures 378b are arranged to receive unfiltered water from within the filter cavity 132 (FIG. 1B). In various embodiments, the number, size, and/or position of the lower and/or upper apertures 378a, 378b can be configured to control the flow rate and attendant dwell time of the water entering the container. For example, a larger number of apertures can increase flow rate, but reduce dwell time.

The filter device 122 further includes lower and upper filter pads 379a, 379b (collectively "filter pads 379"). The lower filter pad 379a is positioned between the filtration media 372 and the containment plate 375, and the upper filter pad 379b is positioned between the filtration media 372 and the removable cap 373. In various embodiments, the filter pads 379 can be configured to further contain the filtration media within the container. In some embodiments, the filter pads 379 can further control flow rate/dwell time of the water entering the filter device 122. In other embodiments, the filter pads 379 can have different configuration or be omitted. For example, the lower and/or upper apertures 378a, 378b can be sized such that one or both of the filter pads 379 is not needed to adequately contain the filtration media within the container 370.

In use, a user can replace the filter device 122 after it has been used for a predetermined amount of time. For example, the user can replace the filter device 122 on a biweekly, monthly, or quarterly basis. The replacement cycle can vary depending on the frequency of use. In one aspect of this embodiment, the filter device 122 is composed of biodegradable materials that make it completely compostable. As such, the user can compost the filter device 122 when it is fully consumed rather than disposing of it in a landfill. For example, the container 370, the containment plate 375, the removable cap 373, and the handle 253 can be composed of thermoplastic aliphatic polyester, such as polylactide (PLA) or other starch based plastics, and/or other compostable materials. The filter pads 379 can include, for example, vegan silk (e.g., Ahisma silk) that is shaped into a mesh structure. The filtration media 372, likewise, is also biodegradable. For example, the filtration media 372 can include coconut shell based activated carbon.

FIG. 4A is a partially exploded top view, and FIG. 4B is a partially exploded side view of the lid 115. Referring to FIGS. 4A and 4B together, the lid 115 includes a central plate 480 having a depressed surface 482 inclined towards the fill inlet 116. At the underside 146, the central plate 480 includes first pivot members 483a (only one is visible), such as arms, tabs, etc., that attach to a shaft 485 of the inlet lever 136. The inlet lever 136 includes cantilever arms 486 attached the shaft 485 and pivotally coupling an inlet cover 488 to a first counterweight 489a. The inlet cover 488 has a surface 490 (e.g., a dome-shaped surface) configured to fit into the fill inlet 116 to close the fill inlet 116. In some embodiments, the inlet cover 488 can include additional or different features, such as gaskets, different shapes, etc. The first counterweight 489a includes a sealed container 492 carrying a ballast element 493. As described in greater detail below, the weight of the ballast element 493 is selected such that the cantilever arms 486 urge the inlet cover 488 towards the fill inlet 116 into a closed position.

The central plate 480 further includes a shelf 495 carrying second pivot members 483b operably coupled to the outlet lever 138. The outlet lever 138 includes an outlet cover 496 pivotally coupled to a second counterweight 489b via the second pivot members 483b. Similar to the first counterweight 489a, the second counterweight 489b can include a sealed container 498 carrying a ballast element 499 configured to urge the outlet cover 496 toward the pour outlet 128 (FIG. 1A) into a closed position.

Figure 5A:
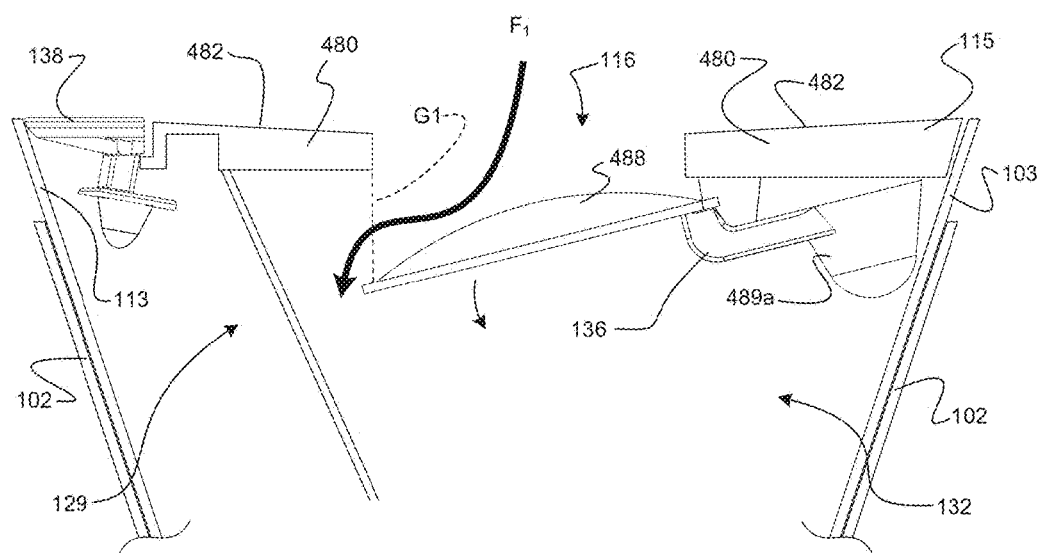
FIGS. 5A and 5B are cross-sectional side views illustrating various stages of operation of the lid assembly of FIGS. 4A and 4B in accordance with an embodiment of the present technology.
Figure 5B:
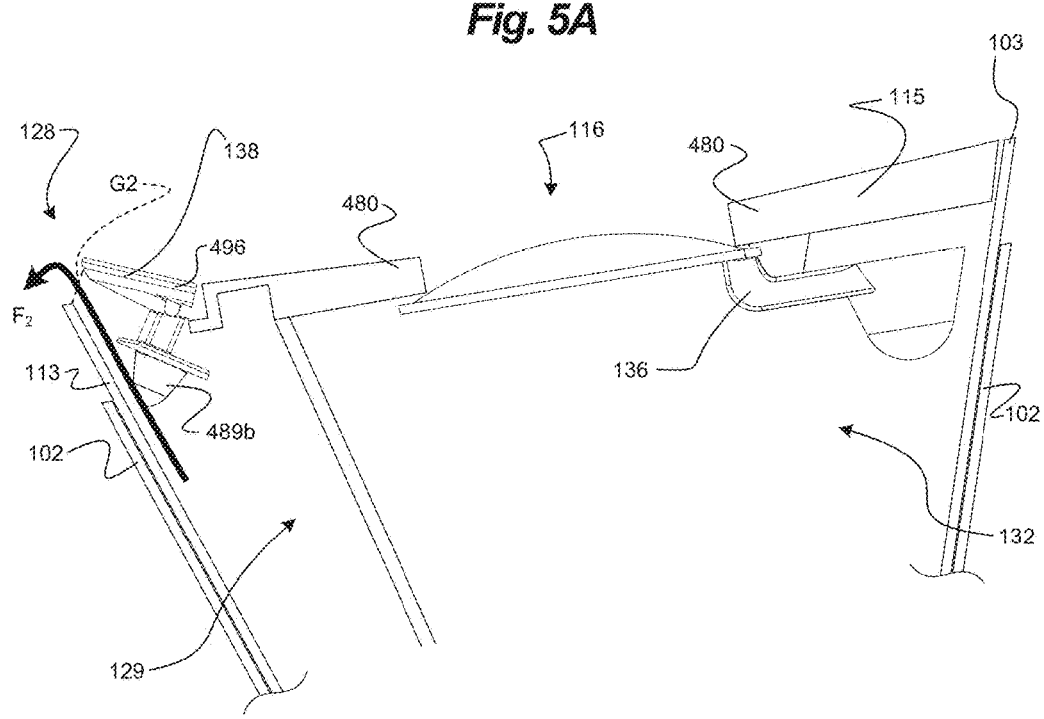

FIGS. 5A and 5B illustrate various stages of operation of the lid 115 when the filter assembly 103 is seated in the vessel 102. FIG. 5A shows the lid 115 in a filling stage in which it is receiving a flow of unfiltered water (as shown, e.g., by arrow $F_1$). As the flow of water contacts the inlet cover 488, the force of the water rotates the inlet lever 136 about a fulcrum to move the fill inlet 116 into an open position. More specifically, the force of the water moves the first counterweight 489a toward the lid 115 to create a gap $G_1$ through which the flow of water can enter the filter cavity 132. When the flow of water ceases (not shown), the weight of the first counterweight 489a can move the inlet cover 488 back toward the fill inlet 116 into the closed position.

In the illustrated embodiment, the flow of water falls directly onto the inlet cover 488 during the fill stage. In other instances, however, at least a portion of the flow of water $F_1$ can also be received at the depressed surface 482 toward the periphery of the fill inlet 116. Because it is inclined toward the fill inlet 116, the depressed surface 482 can direct this water into the fill inlet 116. Accordingly, in certain instances the depressed surface 482 can reduce spillage of water during the filling stage.

FIG. 5B shows the lid 115 in a filling stage in which a flow of filtered water (as shown, e.g., by arrow $F_2$) is dispensed through an open pour outlet 128. As shown, the central plate 480, the filter body 113, and the vessel 102 are tilted from a normal position (e.g., an upright position) to a canted position in a direction toward the pour outlet 128. The outlet lever 138, however, generally does not tilt. Rather, the second counterweight 489b applies a downward force (i.e., toward the bottom of the page) to the outlet cover 496 that resists rotation or tilt of the outlet cover 496 relative to the filter body 113. This, in turn, opens a gap $G_2$ between the outlet cover 496 and the pour channel 129 through which the filtered water can flow out of the pour outlet 128. When the vessel 102 is ultimately returned to the normal position (not shown), the filter body 113 rotates toward the outlet cover 496 to close the pour outlet 128.

In addition to the foregoing advantages described above, the embodiments of the filtration apparatus 100 and its various components can provide other advantages over conventional water filter pitchers. One advantage, for example, is that the gasket 112 firmly seats the filter assembly 103 within the vessel 102. Conventional water filters, by contrast, typically include filter housings that are not well seated within the pitcher. For example, typical water filter pitchers primarily rely on the weight of the water to retain the filter housing into position. As a result, the filter housing can fall out when pouring and cause water to rapidly spill out of the pitcher and overflow onto the countertop, floor, etc. The gasket 112, however, can be configured to hold the filter assembly 103 in place when the vessel 102 is substantially tilted. For example, the gasket 112 can hold the filter assembly in place (with or without water in the filter cavity and/or lower chamber 105b) when the vessel 102 is tilted from a normal position to a canted position at which the vessel is rotated by 90 degrees or more relative to the normal position.

From the foregoing, it will be appreciated that specific embodiments of the disclosure have been described herein for purposes of illustration, but that various modifications may be made without deviating from the spirit and scope of the various embodiments of the disclosure. For example, the filter cavity 132 and the pour channel 129 can have different arrangements or configurations. Moreover, the filter device 122 can have other sizes, shapes, and/or features. For example, rather than apertures, the filter device 122 can include a casing composed of a naturally porous material.

Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A water filter assembly, comprising:
a filter body including a filter cavity;
a lid structure detachably coupled to the filter body, the lid structure including—
a central plate;
a fill inlet extending through the central plate toward the filter cavity; and
an inlet lever operably coupled to the central plate, wherein the inlet lever is configured to close the fill inlet,
wherein the inlet lever is configured to open inwardly into the filter cavity when water flows into the filter cavity such that a flow of water onto the inlet lever temporarily opens the fill inlet such that the flow of water enters the filter cavity via the fill inlet, and wherein the inlet lever is configured to close when water stops flowing onto the inlet lever.

2. The water filter assembly of claim 1 wherein:
the inlet lever includes an inlet cover pivotally coupled to a counterweight; the counterweight is configured to pivot in a first direction to close the inlet port; and
the inlet cover is configured to pivot in a second direction opposite the first direction to open the inlet port.

3. The water filter assembly of claim 1 wherein:
the filter body further includes—
a pour channel separated from the filter cavity, and
a pour outlet in fluid communication with the pour channel; and
the lid structure further includes an outlet lever operably coupled to the central plate, wherein the outlet lever is configured to close the pour outlet, wherein a canting of the filter assembly relative to a normal vector and in a direction toward the pour outlet temporarily opens the pour outlet.

4. The water filter assembly of claim 3 wherein:
the inlet lever includes an outlet cover pivotally coupled to a counterweight, the counterweight is configured to pivot in a first direction to close the pour outlet; and
the outlet cover is configured to pivot in a second direction opposite the first direction to open the pour outlet.

5. The water filter assembly of claim 1 wherein the central plate has a depressed surface at least partially surrounding the inlet port and configured to direct the flow of water toward the inlet port.

\* \* \* \* \*